United States Patent
Colson et al.

(10) Patent No.: US 7,184,539 B2
(45) Date of Patent: Feb. 27, 2007

(54) AUTOMATED CALL CENTER TRANSCRIPTION SERVICES

(75) Inventors: Vicki L. Colson, Tavernier, FL (US); Baiju Mandalia, Boca Raton, FL (US); Ronald D. Swan, Palm Beach Gardens, FL (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 10/425,246

(22) Filed: Apr. 29, 2003

(65) Prior Publication Data

US 2004/0218751 A1 Nov. 4, 2004

(51) Int. Cl.
*H04M 3/00* (2006.01)
(52) U.S. Cl. .................. 379/265.01; 379/88.13
(58) Field of Classification Search ............ 379/88.16, 379/88.17, 88.13, 265.01, 265.09
See application file for complete search history.

(56) References Cited

U.S. PATENT DOCUMENTS

| | | | |
|---|---|---|---|
| 5,884,032 A | 3/1999 | Bateman et al. | |
| 5,970,124 A | 10/1999 | Csaszar et al. | |
| 5,982,863 A | 11/1999 | Smiley et al. | |
| 6,118,866 A | 9/2000 | Shtivelman | |
| 6,314,402 B1 | 11/2001 | Monaco et al. | |
| 6,330,327 B1 | 12/2001 | Lee et al. | |
| 6,332,154 B2 | 12/2001 | Beck et al. | |
| 6,337,904 B1 | 1/2002 | Gisby | |
| 6,381,640 B1* | 4/2002 | Beck et al. | 709/223 |
| 2003/0191643 A1* | 10/2003 | Belenger et al. | 704/254 |
| 2004/0064322 A1* | 4/2004 | Georgiopoulos et al. | 704/277 |
| 2004/0215449 A1* | 10/2004 | Roy | 704/211 |

FOREIGN PATENT DOCUMENTS

GB 2 337 400 11/1999

* cited by examiner

*Primary Examiner*—Creighton Smith
(74) *Attorney, Agent, or Firm*—Akerman Senterfitt

(57) ABSTRACT

A method for communicating with a call center can include receiving a telephony contact from a caller. A discoursive input including free-form speech can thereafter be received. The discoursive input can be converted into a textual transcription. At least a portion of the textual transcription can be presented upon a display screen of a service agent computer system. The telephony contact can be routed to a telephony device associated with the service agent computer system.

23 Claims, 2 Drawing Sheets

AUTOMATED CALL CENTER TRANSCRIPTION SERVICES

BACKGROUND OF THE INVENTION

1. Technical Field

The present invention relates to the field of speech processing and, more particularly, to free-form speech within call centers.

2. Description of the Related Art

Many businesses utilize call centers to market products, to provide customer support, to enact customer reward programs, to manage customer services and accounts, as well as other business related functions. Staffing customer service centers with human agents can be very costly both in terms of salary and in terms of training due to high turn over. Hiring too few employees to operate a customer service center can result in excessive customer wait times that can make using the call center impractical, or at least frustrating, for many customers.

In order to minimize costs while providing high levels of customer support, many businesses choose to automate their call centers by supplementing their human agents with interactive voice response (IVR) systems. IVR systems typically answer incoming telephone calls and present to callers audible menus of selectable options. The callers usually make menu selections in one of two ways: depressing a key or sequence of keys on a touch-tone keypad; or issuing a spoken utterance. For each selection made by a caller, the IVR system can provide further options, conduct an automated action, such as retrieving account information, or connect a caller with a human agent. Oftentimes a plurality of hierarchically related menus is presented which a caller must navigate to find the option that the caller wishes to select. Navigating through such menus can be time consuming and aggravating, especially if the caller makes an incorrect selection during the navigation process.

The cumbersome methods used by conventional IVR systems limit the usefulness of such systems within the context of a call center. For example, a call center may want to solicit necessary customer information before transferring a caller to a human agent. The entered information can thereafter be conveyed to the human agent saving the human agent significant amounts of time. Conventional IVR systems, however, gather information from users by mechanically asking, and often confirming, one discrete query after another through which the caller must persevere. The amount of information that conventional IVR systems can gather is limited by both caller patience and the programmed IVR logic necessary for such tasks.

SUMMARY OF THE INVENTION

The invention disclosed herein provides a method and a system for automated call center transcription services. In particular, a caller can be prompted by an automated system for free-form speech relating to a call. This free-form speech can be translated into a textual transcription. A content analyzer can extract meaning from this textual transcription and perform one or more predefined computer integrated telephony interactions based upon extracted content. Furthermore, extracted content can be stored within a database and utilized by a call center application to fill data necessary for assisting the caller. Accordingly, a human agent within a call center can be presented with substantial information, such as the textual transcription and a summary of the extracted content.

One aspect of the present invention can include a method for communicating within a call center. The method can include receiving a telephony contact from a caller. A discoursive input including free-form speech can be received from the caller. In one embodiment, at least a portion of the free-form speech can be a free format monologue. A digital recording of the discoursive input can be stored and can be converted into a textual transcription.

In one embodiment, selected words within the textual transcription can be identified based upon predefined criteria. At least a portion of the selected words can be relayed to the human agent. Additionally, words matching the selected words that appear within the textual transcription can be highlighted. At least one computer telephony integration action can also be performed based in part on the selected words. For example, a qualified human agent can be determined from among a group of potential human agents and a connection can be established between the caller and a service agent computer system associated with the qualified human agent. In a further embodiment, at least a portion of the selected words can be recorded within a database that the human agent can access. In another embodiment, the service agent computer system can contain data fields populated automatically from information gathered from the selected words.

When converting the discoursive input into the textual translation, a language translation can be performed. Moreover, two textual translations, one in the same language as the discoursive input, the other in the translated language, can be conveyed to the service agent computer system. At least a portion of the textual transcription can be displayed upon a display screen of the service agent computer system. A telephony connection can be routed to a telephony device associated with the service agent computer system.

Another aspect of the present invention can include a system for producing transcriptions within a call center. The system can include an integrated voice response system configured to prompt a caller for discoursive input including free-form speech and store the discoursive input as a digital recording. The integrated voice response system can convey at least one of the digital recordings to a transcription server, which can convert the digital recording into a textual transcription. The system can also include a call center application accessible by a human agent. A coordination processor can establish a connection between the caller and the human agent. Furthermore, the coordination processor can convey the textual transcription to the call center application.

In one embodiment, a content analyzer can be included that can identify key words contained within the textual transcription. In another embodiment, the system can include a speech recognition engine configured for telephony requirements. The speech recognition engine can be utilized by the transcription server. Additionally, a translation processor can convert the textual transcription into a language other than the language of the discoursive input. In yet another embodiment, a data store can be used by the call center application. The data store can contain data fields for recording information related to a call between the caller and the human agent. At least a portion of the data fields can be automatically filled based upon information generated by the content analyzer.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a system and a method for providing call center employees with transcriptions. More particularly, a user of an interactive voice response system (IVR) can be asked for discoursive input including free-form speech relating to a telephone call. This discoursive input can be converted, using a voice recognition application, into a textual transcript. The textual transcript can be examined for content, for example by extracting key words or phrases. The extracted content can direct the IVR program to perform the tasks specified by the extracted words or phrases. Whenever the call is transferred to a human agent of the call center, the key words and textual transcript will be presented to the human agent to expedite the telephone session. Furthermore, key data fields of a call center application that are necessarily recorded can be filled in automatically, to the extent possible, from content gathered from the discoursive input.

Figure 1:
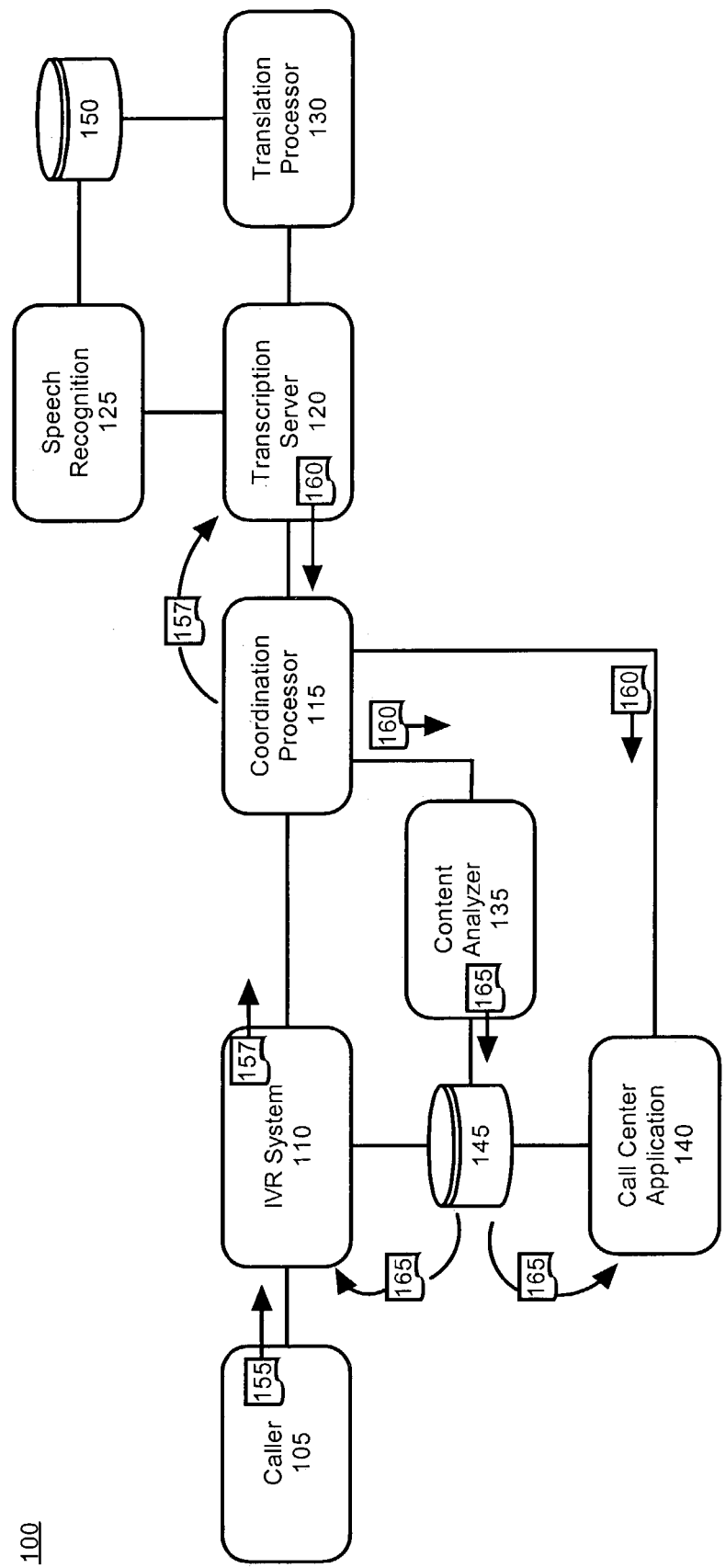
FIG. 1 is a schematic diagram illustrating an exemplary call center including transcription services in accordance with the inventive arrangements disclosed herein.

As used herein, discoursive input can include non-constrained free-form speech. Discoursive input can be contrasted with a directed dialogue, which utilizes a question and answer paradigm and constrained responses. For example, a typical discoursive input is akin to responses occurring within discussions or conversations between people and can include one or more free-form speech sentences or sentence fragments. A directed dialogue, on the other hand, can include short replies that are directly responsive to a prompted question, such as an account number or yes/no reply. 16 FIG. 1 is a schematic diagram illustrating an exemplary call center system 100 including transcription services in accordance with the inventive arrangements disclosed herein. The system 100 can include a coordination processor 115, a transcription server 120, a content analyzer 135, and a content data store 145. The coordination processor 115 can control and synchronize activities within system 100, assuring data is received and processed by the proper system components. More particularly, the coordination processor 115 can perform workflow coordination, queuing, prioritization, and load balancing within the system.

For example, the coordination processor 115 can receive numerous digital recordings 157 from an IVR system 110, each digital recording 157 representing a different discoursive input 155 between the IVR system 110 and a caller 105. The IVR system 110 can have an established prioritization scheme for processing different types of callers, which the coordination processor 115 can enable. In one embodiment, different IVR systems 110, perhaps owned by different businesses, can utilize the transcription service of system 100. Moreover, different IVR systems 110 can purchase different service plans, where users accessing transcription related services via one service plan can have priority over other users receiving access under a different service plan. The coordination processor 115 can assure that requests for each business entity are treated according to the service plan that was purchased. In another example, the transcription server 120 can include multiple computing devices and the coordination processor 115 can load balance among the available computing devices.

The transcription server 120 can accept the digital recording 157, perform speech recognition operations upon the digital recording 157, and return a textual transcription 160. Textual transcriptions 160 can be provided in different formats, such as a portable document format (PDF), a word processing format, or a Web based format, for different requestors according to the needs of a requesting call center application 140 and selectable options chosen therein. In particular embodiments, the transcription server 120 can include multiple textual transcriptions 160 for a single discoursive input 155. For instance, the textual transcription 160 can be optimized for the content analyzer 135 containing minimal formatting and deleting unnecessary words. In another example, two textual transcriptions 160 can be produced, one written in the language of the caller 105, and the other written in a language preferred by the call center application 140. In producing transcriptions, the transcription server 120 can utilize a speech recognition component 125 and a translation processor 130.

The speech recognition component 125 can convert verbal free-form responses into text. The speech recognition component 125 can match a voice pattern against a provided or acquired vocabulary. In order to convert discoursive input, the speech recognition component 125 can have relatively sophisticated capability to accept natural speech or free format speech, as opposed to a limited set of command or vocabulary, as is typically the case with an IVR, and convert this free format speech input into text. For example, the speech recognition component 125 can discern topic related dependencies of words within sentences via content analysis technique such as n-gram modeling. Advanced embedded grammars can be utilized by the speech recognition component 125 to handle the large domain of free format speech which the speech recognition component 125 can be configured to recognize.

The speech recognition component 125 can have both speaker dependant and speaker independent aspects. The speaker dependant aspects can include speech recognition training algorithms and other components to improve speech recognition accuracy for select system users. Further, speech acoustics within the speech recognition component 125 can be adjusted for acoustic idiosyncrasies inherent in a telephony environment, such as background noise and static. A speech data store 150 can be utilized by the speech recognition component 125 to store and allow retrieval of data related to the speech recognition process.

The translation processor 130 can convert an input from one language into an output written in a second language. Translation processor 130 can accept textual input from the speech recognition component 125 convert the textual input into text written in a different language. The translation processor 130 can be written in a language independent manner, with special language models capable of being loaded depending on the translation instance. The specific language model to be utilized can be determined through a user selection, such as entering a keypad number representing a language.

The content analyzer 135 can accept the textual transcription 160, extract contextual meaning by examining key words and phrases, and output a transcription content 165 message. For example, key words such as sale, defect, and warranty can be used by the context analyzer 135 to help discern meaning from the textual transcription 160. In one embodiment, key words extracted by the content analyzer 135 can be highlighted within the transcription content 165 message. In another embodiment, the key words utilized by the content analyzer 135 can determine which call center agent should be selected to handle a particular matter. For example, a technician can receive a phone call if key words such as help, broken, fix, an/or repair are detected.

Different and/or multiple formats of the transcription content 165 can be produced depending on the component within the system 100 for which the transcription content 165 was produced. For example, if the transcription content 165 is produced for an IVR system 110, the content can be formatted to correspond to IVR functions. If, on the other hand, the transcription content 165 is produced for the call center application 140 for a human agent to read, it may be formatted as a content summary.

In one embodiment, the content analyzer 135 can extract information from the textual transcription 160 and automatically enter data fields within the call center application 140 using this extracted information. For example, information such as caller name, topic, account number, date of call, and caller phone number can be extracted from the textual transcription 160 or derived from available data sources and placed within a database used by the call center application 140. Such data entry can be tentative, requiring confirmation by a call center employee before being utilized within a database of the call center application 140. The content analyzer 135 can produce transcription content for one or more IVR systems 110 and/or for one or more call center applications 140. Different considerations and content analyzing details can apply to different call center applications 140 and/or different IVR systems 110.

A content data store 145 can be used to store the transcription content. In one embodiment, the content data store 145 can perform data synchronization and data field matching operations with various databases, such as a database of the call center application 140. In another embodiment, the IVR system 110 and the call center application 140 can store options within the content data store 145 that the content analyzer 135 can access and utilize when generating the transcription content 165. For example, the IVR system 110 can record all available IVR functions within the content data store 145. The content analyzer 135 can utilize this record of IVR functions to generate transcription content 165 capable of triggering the proper IVR operations.

In operation, a caller 105 can connect to an IVR system 110. The caller 105 can then utilize the IVR system 110 in a conventional manner with a possible transfer to a call center agent occurring or can conduct a discursive input 155 detailing the purpose behind the call. Upon detecting a discursive input 155, the IVR system can convert the discursive input 155 into a digital recording 157.

The digital recording 157 can then be conveyed to the coordination processor 115. The coordination processor 115 can queue the digital recording 157 and determine the best available resources for producing a transcription. Once particular resources are allocated, the digital recording 157 can be transported the transcription server 120. The transcription server 120 can determine if a language translation is necessary and utilize the speech recognition component 125 to convert the speech input into text. In one embodiment, the caller 105 can be prompted to enter the language of the discoursive input 155. The response to this prompting can determine if a language translation via the translation processor is necessary. If need for a translation is indicated, the text output from the speech recognition component 125 can be sent to the translation processor 130 and the translation processor 130 can perform a requested translation. The newly generated textual transcription 160 can be sent back to the coordination processor 115.

The coordination processor 115 can relay one copy of the textual transcription 160 to the content analyzer 135 for processing. The content analyzer 135 can produce transcription content 165 messages by analyzing key words and phrases contained within the textual transcription 160. These derived key words and phases can determine whether the caller 105 is transferred to the IVR system 110 or whether the caller 105 is transferred to an appropriate call center agent, wherein a selective one of available call center agents can be determined using the extracted key words.

The content analyzer 135 can place transcription content into the content data store 145 so that both the IVR system 110 and the call center application 140 can utilize the extracted data. In one embodiment, the content analyzer 135 can produce a summary of the transcription content as a quick overview for the textual transcription 160. In a further embodiment, Identified key words and phrases can be highlighted within both the summary of the content and the textual transcription itself.

When a call center agent is selected for the telephone transfer, the coordination processor 115 can transfer a copy of the textual transcription 160 to a service agent computer system, which can be a component of the call center application 140. The call center application 140 can then assure that the appropriate information is displayed within the service agent computer system associated with the selected agent. For example, when a connection between a call center agent and the caller 105 is established, the call center application 140 can assure that the corresponding textual transcription and content data store 145 information can be displayed for the call center agent. In one embodiment, a list of queued callers can appear within a GUI of the call center application 140. A call center agent can make a selection from this list and be presented with corresponding transcription data as a connection with the caller 105 is established.

Figure 2:
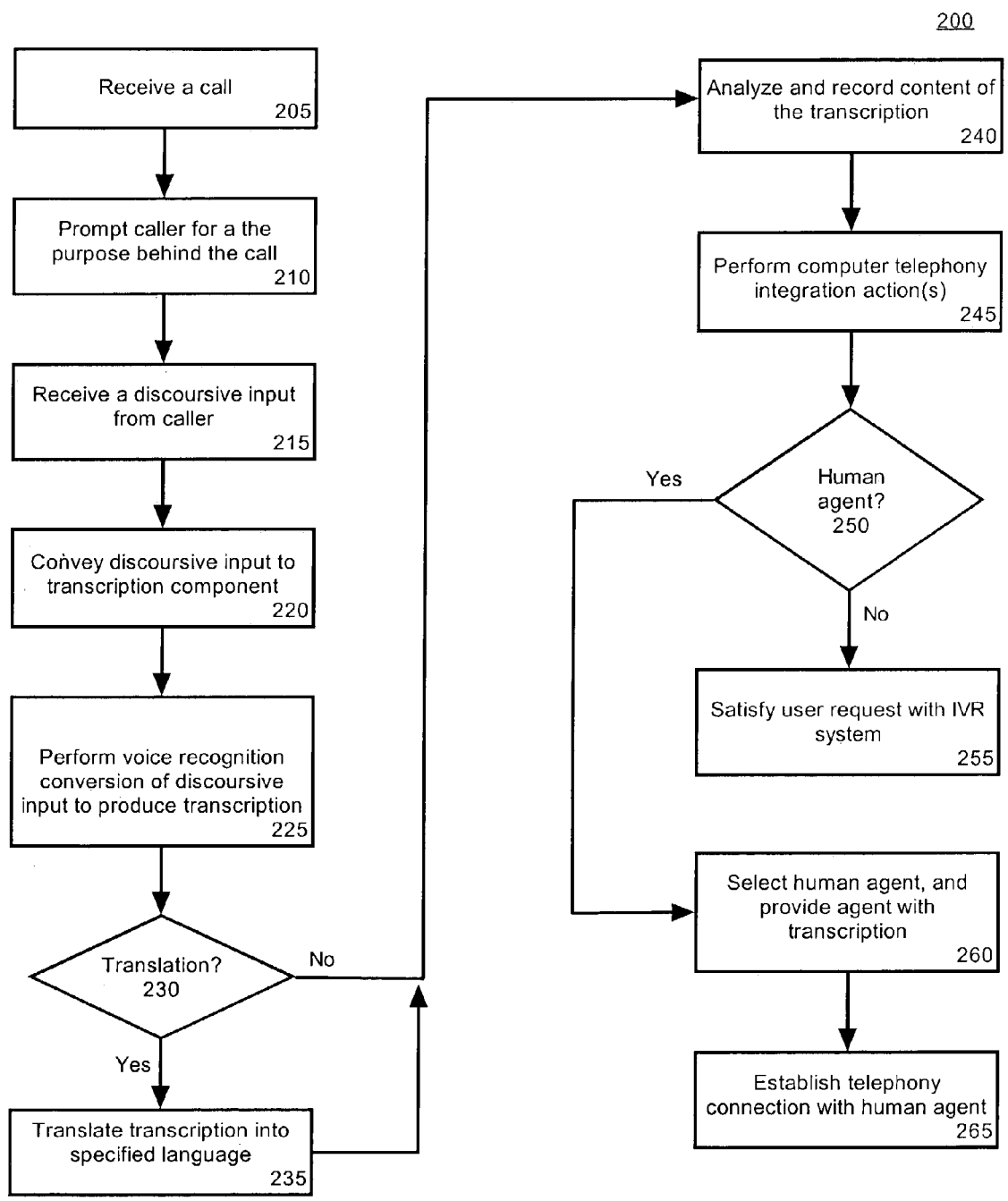
FIG. 2 is a flow chart illustrating a method of utilizing call center transcription services using the system of FIG. 1.

FIG. 2 is a flow chart illustrating a method 200 of utilizing call center transcription services using the system of FIG. 1. The method 200 can be performed within the context of a caller utilizing a call center system that includes an IVR system. The method can begin in step 205, when a call is received by the IVR system. In step 210, the IVR system can prompt the user for information relating to the call, such as the purpose of the call. Such a prompting can be as simple as asking the user to describe in plain language information, such as personal information including name and account information, the user's reason for contacting the call center, and the like. In one embodiment, this prompting for a free form speech response can be combined with traditional IVR promptings. For example, a user contacting the call center can be asked to speak or enter a customer identification number and to select a language of choice. Thereafter, the system can prompt the user, in the appropriate language, for free-form speech. In step 215, the system can receive and record free-form speech from the caller.

In step 220, the recording of the discoursive input can be conveyed to a transcription component within the call center system. In one embodiment, speech inputs can be placed in a queue and prioritized before being submitted to the transcription component. In step 225, a voice recognition application can convert the recording into a textual transcription. Embedded grammars and special language models may be necessary to handle the large domain of specific free form speech. In step 230, a determination can be made as to whether or not the textual transcription should be translated into a particular language.

If a translation is desired, the method can proceed to step 235, where a translation operation is performed. Multiple different translations can be conducted depending on a caller language selection and available language dictionaries available for translation purposes. Such a dynamic translation can add significant flexibility into the system. For example, a caller with Russian as a first language and English as a second language can speak in Russian even though the caller's discoursive input will be translated into English and the caller will be connected with an English human agent. This feature can allow a speaker to express himself or herself in a familiar language instead of struggling for proper expression within a language which is less well known to the speaker. The feature can also save the human agent substantial time, as the translated textual transcription will likely be more clearly conveyed than subsequent potentially strained English communications with the caller. Once the translation is completed, the method can proceed to step 240.

If no translation is needed in step 230, the method can proceed directly to step 240, where the contents of a transcription can be analyzed. Key words and phrases can be identified during this step that can direct the automated system to take appropriate actions. Extracted customer information or information that could be useful to a human agent can also be stored during this step. In step 245, the system can perform one or more computer telephony integration actions in response to determinations made in step 240. Computer telephony integration is a term used in describing the computerized services of call centers, such as those that direct a phone call to a proper extension. Computer telephony integration actions can include, but are not limited to, such actions as authenticating callers, interpreting touch-tone input, providing interactive voice response options to callers, conveying gathered information to a call center human agent, accessing account information, collecting and displaying messages, receiving fax messages, and initiating smart computing agent applications to provide help with a caller's request.

In step 250, a determination is made as to whether a human agent should be contacted. If not, the method can proceed to step 255, where the user can be transferred to an IVR system so that the IVR system can satisfy the user's request or take other action. Transfers to the IVR system can occur due lack of available human agents as well as the ability of the IVR system to automatically handle a caller's request. For example, assuming the content analyzer has determined that a caller is attempting to pay a utility bill and detects name, account number, payment amount, and credit card number from provided free-form speech, then the IVR system can have all necessary information, other than user confirmation to complete the payment. In such a situation, there may be no reason to transfer a caller to a human agent. Instead, the IVR system can query the user for confirmation of the received information and payment desire and perform the requested action without agent intervention.

If, on the other hand, step 250 determines that a human agent should be contacted, the method can proceed.

If a human agent is indicated, the method can proceed to step 260, where a specific human agent that satisfies caller criteria, such as speaking the caller's language or handling the caller's issue, can be selected. This selected human agent can be provided with a copy of the transcription as well as contextually extracted information. In step 265, a telephony connection can be established between the caller and the selected human agent. Since the portions of necessary information may have already been extracted and recorded by the method, the human agent may not need to ask as many preliminary questions for data gathering purposes, as otherwise necessary.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for communicating within a call center comprising the steps of:
   receiving a telephony contact from a caller;
   receiving discoursive input comprising free-form speech;
   converting said discoursive input into a textual transcription;
   displaying at least a portion of said textual transcription upon a display screen of a service agent computer system;
   routing said telephony contact to a telephony device associated with said service agent computer system;
   identifying selected words within said textual transcription based upon predefined criteria; and,
   relaying at least a portion of said selected words to said display screen.

2. The method of claim 1, wherein said displaying step further comprises the step of:
   highlighting words within said textual transcription that are equivalent to said selected words.

3. The method of claim 1, further comprising the steps of:
   recording at least a portion of said selected words within a database; and,
   within said relaying step, retrieving information from said database.

4. The method of claim 1, further comprising the step of:
   performing at least one computer telephony integration action based in part on said selected words.

5. The method of claim 4, wherein said at least one computer telephony integration action comprises the step of:
   determining a qualified human agent among a group of potential human agents, wherein said qualified human agent is associated with said service agent computer system.

6. The method of claim 1, wherein said service agent computer system contains data fields and entry of information into said data fields is required, said method further comprising the step of:

automatically entering data into at least a portion of said data fields based upon information contained within said selected words.

7. The method of claim 1, wherein at least a portion of said discoursive input is a free format monologue.

8. The method of claim 1, wherein said converting step further comprises the steps of:

converting said discoursive input into a temporary textual translation written in a first language; and, translating said temporary textual translation into said textual translation written in a second language.

9. The method of claim 8, wherein said conveying step further comprises the step of:

conveying at least a portion of said temporary textual translation to said service agent computer system.

10. A system for producing transcriptions within a call center comprising:

an integrated voice response system configured to prompt a caller for a discoursive input and store said discoursive input as a digital recording;

a transcription server configured to convert at least one of said digital recordings received from said integrated voice response system into a textual transcription;

a call center application accessible by a human agent;

a coordination processor configured to establish a connection between said caller and said human agent, wherein said coordination processor is further configured to convey said textual transcription to said call center application; and, a content analyzer configured to identify key words contained within said textual transcriptions.

11. The system of claim 10, further comprising:

a content analyzer, configured to identify key words contained within said textual transcriptions.

12. The system of claim 10, further comprising:

a speech recognition engine configured for telephony requirements, wherein said speech recognition engine is utilized by said transcription server.

13. The system of claim 10, further comprising:

a translation processor configured to convert said textual transcription into a language other than the language of said discoursive input.

14. The system of claim 10, further comprising:

a data store used by said call center application containing data fields for recording information related to a call between said caller and said human agent, wherein at least a portion of said data fields are automatically filled in based upon information generated by said content analyzer.

15. A machine-readable storage having stored thereon, a computer program having a plurality of code sections, said code sections executable by a machine for causing the machine to perform the steps of:

receiving a telephony contact from a caller;

receiving discoursive input comprising free-form speech;

converting said discoursive input into a textual transcription;

displaying at least a portion of said textual transcription upon a display screen of a service agent computer system;

routing said telephony contact to a telephony device associated with said service agent computer system;

identifying selected words within said textual transcription based upon predefined criteria; and, relaying at least a portion of said selected words to said display screen.

16. The machine-readable storage of claim 15, wherein said displaying step further comprises the step of:

highlighting words within said textual transcription that are equivalent to said selected words.

17. The machine-readable storage of claim 15, further comprising the steps of:

recording at least a portion of said selected words within a database; and, within said relaying step, retrieving information from said database.

18. The machine-readable storage of claim 15, further comprising the step of:

performing at least one computer telephony integration action based in part on said selected words.

19. The machine-readable storage of claim 18, wherein said at least one computer telephony integration action comprises the step of:

determining a qualified human agent among a group of potential human agents, wherein said qualified human agent is associated with said service agent computer system.

20. The machine-readable storage of claim 15, wherein said service agent computer system contains data fields and entry of information into said data fields is required, said machine-readable storage further comprising the step of:

automatically entering data into at least a portion of said data fields based upon information contained within said selected words.

21. The machine-readable storage of claim 15, wherein at least a portion of said discoursive input is a free format monologue.

22. The machine-readable storage of claim 15, wherein said converting step further comprises the steps of:

converting said discoursive input into a temporary textual translation written in a first language; and, translating said temporary textual translation into said textual translation written in a second language.

23. The machine-readable storage of claim 22, wherein said conveying step further comprises the step of:

conveying at least a portion of said temporary textual translation to said service agent computer system.

\* \* \* \* \*